(12) United States Patent
Caron et al.

(10) Patent No.: US 7,152,370 B2
(45) Date of Patent: Dec. 26, 2006

(54) CAPILLARY CARPET AND METHOD OF MANUFACTURING THEREOF

(75) Inventors: Jean Caron, St-Romuald (CA); Jocelyn Boudreau, Ste-Foy (CA)

(73) Assignee: Université Laval, Quebec (CA)

( * ) Notice: Subject to any disclaimer, the term of this patent is extended or adjusted under 35 U.S.C. 154(b) by 0 days.

(21) Appl. No.: 11/153,442

(22) Filed: Jun. 16, 2005

(65) Prior Publication Data

US 2005/0268552 A1 Dec. 8, 2005

Related U.S. Application Data

(63) Continuation of application No. PCT/CA02/02014, filed on Dec. 23, 2002.

(51) Int. Cl.
*A01G 25/00* (2006.01)

(52) U.S. Cl. .......................................................... 47/82

(58) Field of Classification Search ................ None
See application file for complete search history.

(56) References Cited

U.S. PATENT DOCUMENTS

| 4,955,158 | A | 9/1990 | Lyon |
| 6,178,691 | B1 | 1/2001 | Caron et al. |

FOREIGN PATENT DOCUMENTS

| GB | 2 069 926 A | | 9/1981 |
| GB | 2 193 072 A | | 2/1988 |
| JP | 2001304046 | * | 9/2001 |
| WO | WO 00/65901 | | 11/2000 |

* cited by examiner

*Primary Examiner*—Francis T. Palo
(74) *Attorney, Agent, or Firm*—Ogilvy Renault LLP

(57) ABSTRACT

A capillary carpet irrigation system comprises a capillary carpet (10) having a series of individual capillary mat sections (9a, 9b, 9c . . . ) hydraulically isolated from one another by a water impermeable base membrane (18), thereby preventing water migration from one section to the next. This discontinuity advantageously allows the capillary carpet (10) to operate on sloppy surfaces and promotes effective capillary connection between coarse growing media and the mat. A protective water permeable membrane (15) is provided on top of the series of individual capillary mat sections (9a, 9b, 9c . . . ).

14 Claims, 2 Drawing Sheets

CAPILLARY CARPET AND METHOD OF MANUFACTURING THEREOF

RELATED APPLICATION(S)

This application is a continuation of PCT Parent Application No. PCT/CA2002/02014 filed on Dec. 23, 2002, which is herein incorporated by reference.

BACKGROUND OF THE INVENTION

1. Field of the Invention

The present invention generally relates to sub-irrigation systems and, more particularly, to a new capillary carpet irrigation system and the method of manufacturing thereof.

2. Description of the Prior Art

Sub-irrigation systems where plants in pots are placed upon capillary mats which provide water through capillary action into the bottom of a permeable pot are well known in the art.

A significant advantage of the sub-irrigation system is that no further equipment is required other than that already at the disposal of producers who generally use overhead sprinkler irrigation systems.

The sprinklers are used to water the plants and any water falling between pots is captured by the capillary mat. The water saturated capillary mat thereafter, provides water on demand through capillary action from the roots and permeable base of the pot resting on the capillary mat. Sub-irrigation allows water to be provided according to the needs of each plant on demand since water is drawn up under capillary action by the roots and permeable pot base resting on the saturated capillary mat.

Therefore, sub-irrigation on capillary mats is a viable alternative that meets the objectives of a closed system namely, elimination of runoff water and environmental risks associated and efficient use of water and fertilizers over conventional systems. Sub-irrigation on capillary mats generally involves maintaining the capillary mats at or near saturation point in order to provide the plants with a constant supply of water. Water moves from the saturated mat to the pots, soil substrate and roots by capillary ascent.

However, due to several disadvantages, the use of capillary mats has traditionally been restricted to greenhouse applications. For example, the water held by the mat often evaporates from the surface and constitutes a net loss in addition to contributing to salts accumulation, nutrients, etc. on the mat surface itself. In humid greenhouses however, where there is a high relative humidity and absence of air movement, evaporation is not a major problem in contrast to field conditions. In an open field, algae and weeds will rapidly grow in the exposed surface of the capillary mat. As well, in an open field the low relative humidity of the air, solar heat radiation and high air movements will result in high evaporative losses. As result therefore, these drawbacks have limited the interest in sub-irrigation practices for outdoor use in nurseries. Although sub-irrigation can eliminate runoff in the environment, the net result is a decrease in water use efficiency due to high evaporative losses.

To address the problem of surface evaporation and accompanying salt accumulation on the capillary mat, and to limit algae growth and weed growth in the capillary mats, prior art systems have included a porous perforated plastic sheet on the top surface of the capillary mat. The perforated sheet allows rain water and irrigation sprinkler water to flow through the perforations into the capillary mat. The perforated sheet also allows water to flow out of the capillary mat into the bottom of permeable pots resting on the mat. While dark colored perforated plastic sheets have been very efficient in preventing algae growth in the capillary mat, they still allow significant evaporation from the surface to the extent that evaporated losses exceed losses experienced through recycling or standard irrigation with no recycling. The stored water surface is directly under the top perforated sheet in such prior art carpets, and evaporative loss through the perforated sheet is prohibitively high.

This problem has been addressed in U.S. Pat. No. 6,178,691 issued on Jan. 30, 2001 to Caron et al., the content of which is herein incorporated by reference. U.S. Pat. No. 6,178,691 discloses a four layer irrigation carpet, including an impervious base membrane, and a permeable top membrane enveloping a water bearing rigid porous mat and an overlying resilient compressible coarse porous mat. The compressible mat is resiliently compressible under each pot and where compressed, it defines a plurality of localized capillary action conduits between the water bearing rigid mat and each water permeable pot through the permeable top membrane. The resilient compressible mat when decompressed has a negligible capillary rise and serves to inhibit evaporative water loss from the underlying rigid mat. The pores of the compressible mat impede air circulation immediately above the upper surface of water held in the water bearing rigid mat, The air within the compressible mat pores immediately above the rigid mat therefore have a high humidity and water vaporisation at the surface is therefore inhibited by the high vapour concentration of air in the compressible pores. Air circulation within the compressible mat is impeded by the inherent resistance of the porous structure. Thus, water vapor escape from the water surface in the rigid mat through the perforations of the top membrane is impeded reducing evaporative water loss, even when used in outdoor applications.

While the capillary carpet disclosed in the above-mentioned patent constitutes a major improvement over conventional capillary carpets, it has been found that when installed on greenhouse surfaces or directly on the soil in a field, drainage and, thus, loss of stored water occurs, resulting in a loss of efficiency of the carpet. Poor capillary contact may also exist with some very coarse growing media if free water (water with no tension) is not present at the mat surface in an early stage of capillary rise. As soon as a little slope exists though, drainage conditions are created and watering the mat results in location having water under tension at all times. The lowest point in the field will determined the tension. This tension prevents good capillary rise with coarse media and may induce stresses to the plant, generally resulting in yield losses to the grower. The water contained in the mat will flow by gravity from the highest point to the lowest point in the field, thereby withdrawing water from the sections of the mat which are located on the highest point. This will also cause water contained in the pots located on these highest sections of the mat to be submitted to a suction force, resulting in a portion of the water in the pots to be drained off.

There is thus a need to find a way of avoiding important water tension to be created even though the carpet is laid down on a sloped supporting surface. There is also a need to improve capillary rise in coarse growing media.

SUMMARY OF THE INVENTION

It is therefore an aim of the present invention to provide a new capillary carpet which can operate on uneven and sloppy supporting surfaces.

It is a further aim of the present invention to provide a new capillary carpet that is adapted to efficiently operate with coarse growing media.

It is a still further aim of the present invention to provide a new method for manufacturing a capillary carpet.

Therefore, in accordance with a general aspect of the present invention, there is provided a capillary carpet comprising:

a water impermeable base membrane;

a water permeable top membrane; and a layer of spaced-apart capillary mat units disposed between the base membrane and the top membrane, each capillary mat unit being capable of receiving water from the irrigation means and defining a plurality of capillary action conduits between the base membrane and each water permeable pot through the permeable top membrane, wherein said capillary mat units are hydraulically isolated from one another to prevent water to flow from one unit to another.

In accordance with a further general aspect of the present invention, there is provided a capillary carpet for watering plants in pots under a capillary rise, comprising at least one individual carpet assembly having a capillary mat unit sandwiched between a water permeable top membrane and a water impermeable base membrane, and water barrier means surrounding said capillary mat to form a water impermeable basin therearound.

In accordance with a still further general aspect of the present invention, there is provided, a method of manufacturing a capillary mat comprising the steps of providing a web of water impermeable material, providing a web of capillary mat material on said web of water impermeable material, cutting said web of capillary mat at longitudinally spaced-apart locations to form a series of capillary mat units, hydraulically isolating said capillary carpet units from on another by forming a series of folds in said web of water impermeable material between adjacent capillary mat units, and covering a top surface of said web of capillary mat material with a water permeable protective web.

In accordance with a still further aspect of the present invention, there is provided a method of installing a capillary carpet on a supporting surface, comprising the steps of: providing a length of capillary carpet, the carpet including a water impermeable base layer, a water permeable top layer and a capillary mat between said top and base layers, and providing a series of spaced-apart water barriers along said length of capillary carpet to limit travel of water through said mat.

Further details of the invention and its advantages will be apparent from the detailed description and drawings included below.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
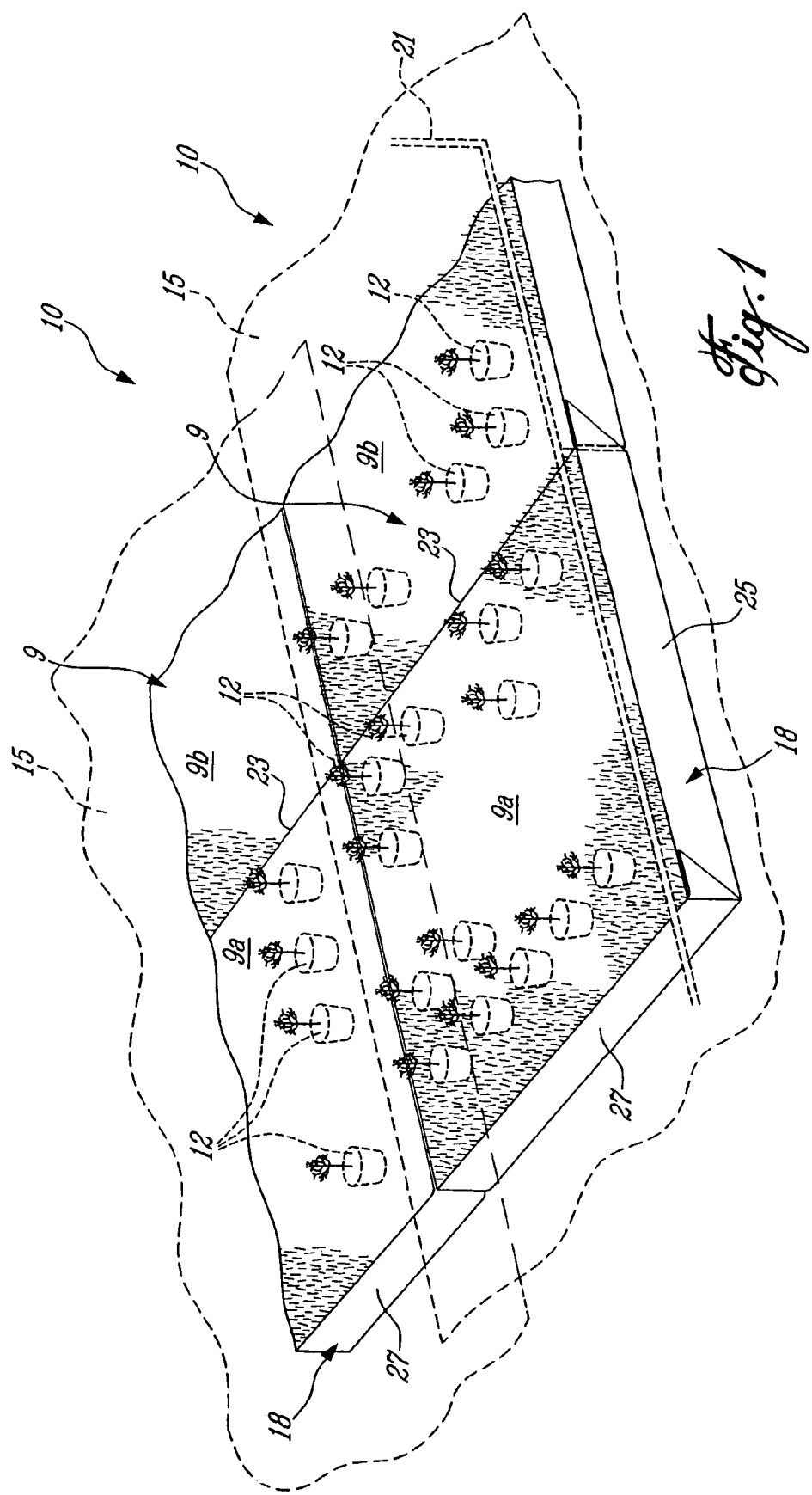
FIG. 1 is a perspective view of an array of nursery pots with stock plants placed upon a capillary carpet comprising a series of hydraulically isolated capillary mat units in accordance with a preferred embodiment of the present invention.
Figure 2:
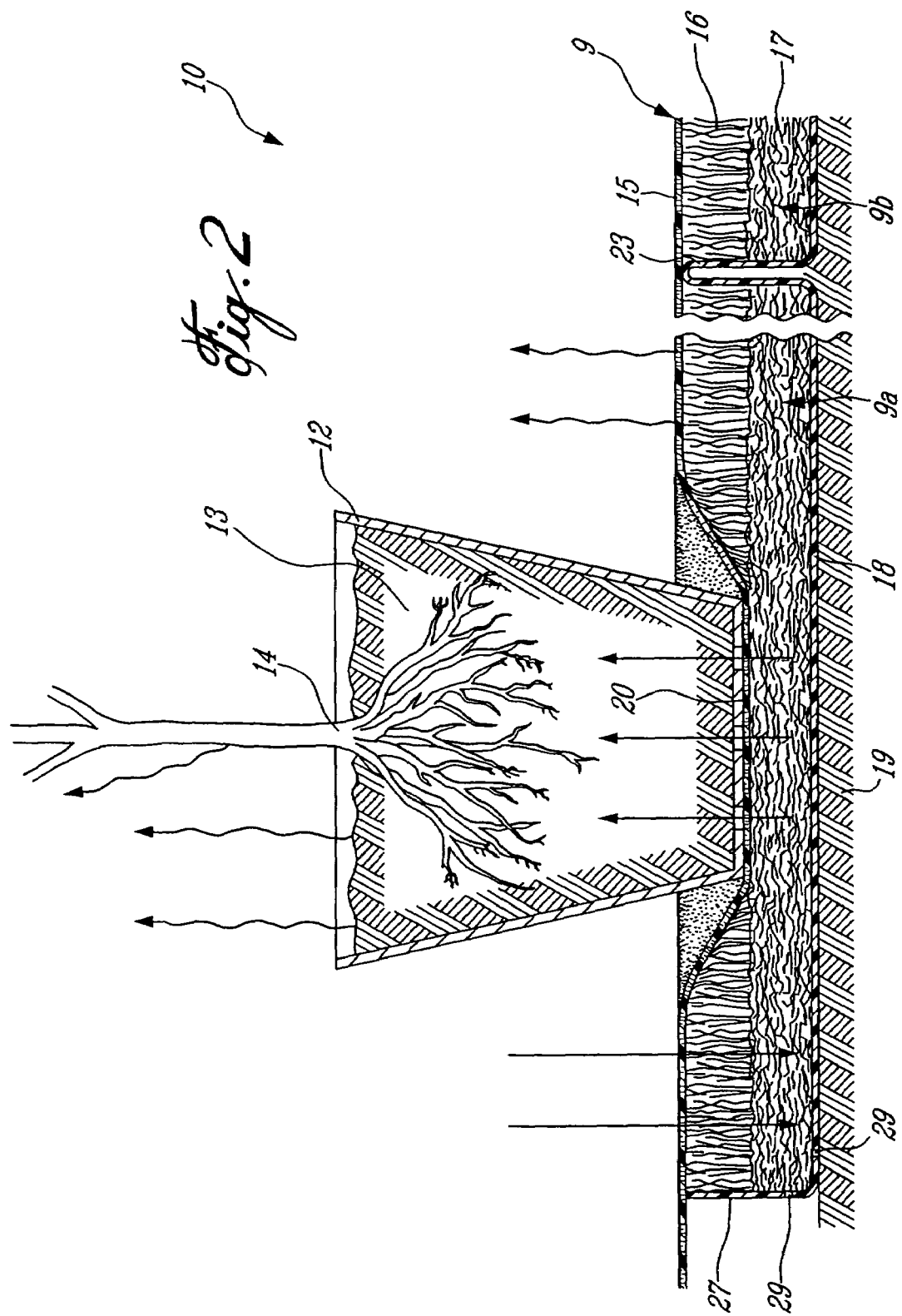
FIG. 2 is a cross-sectional elevation view of the capillary carpet mat with a nursery pot container placed thereon showing the collapsing of the compressible porous mat, thereby permitting capillary conduction of water between the water bearing rigid mat and the permeable bottom of the pot.

With reference to FIGS. 1 and 2, the drawings show a water bearing capillary carpet 10 used in a sub-irrigation system. The water bearing capillary carpet 10 is disposed on a supporting soil surface 19. As indicated in FIG. 1, an array of water permeable pots 12 rest upon the capillary carpet 10. The pot 12 contains soil or other growing medium 13 and embedded plants roots 14. The base of the pot 12 is water permeable with a permeable pot base 20. For example, the pot base 20 may have perforations or is made of a permeable material such as compressed peat.

As indicated in FIG. 1, sprinkler irrigation heads 21 (or other conventional irrigation systems such as perforated micro-irrigation conduits) are used to charge the carpet 10 with water. The permeable pot base 20 is in hydraulic connection with the carpet 10. Stored water in the capillary carpet 10 is passed through the permeable pot base 20 into the growing medium 13 and plant roots 14 by capillary action. FIG. 2 illustrates the cycle of water movement through the carpet 10 and pot container 12.

Referring to FIG. 2, the capillary carpet 10 preferably comprises a water impermeable base membrane 18, a water permeable top membrane 15, and a capillary mat assembly 9 between the base membrane 18 and the top membrane 15. The capillary mat assembly 9 preferably comprises a rigid capillary mat 17 and a compressible capillary mat 16.

The base membrane 18 is impermeable and can comprise a commonly available polyethylene agricultural sheet for example. The top membrane 15 is water permeable to allow the passage of irrigated sprinkler water downward or rainfall water into the carpet itself 10 and to allow capillary passage of water from the carpet 10 to the permeable pot base 20. A dark colored micro-perforated polyethylene sheet is preferred. The dark color will inhibit the growth of algae in the wetted interior surfaces of the capillary carpet 10. The micro-perforated structure will permit slow capillary passage of water from the capillary carpet 10 to the pot 12 while also inhibiting rapid evaporation of the water from the interior of the carpet 10 to a limited extent.

The rigid capillary mat 17 is maintained generally in a water saturated state. The collapsible capillary mat 16 is disposed upon the rigid mat 17. The rigid capillary mat 17 rests upon the impermeable base membrane 18 and is capable of receiving water and storing water from the irrigation system 21. The rigid mat 17 retains adequate hydraulic transmissivity while supporting the weight of the pots 12 and weight of worker's walking on the carpet surface. For example, the rigid mat 17 can comprise a non-woven synthetic geofabric with a fine pore structure and sufficient rigidity to support the loads imposed on it while maintaining its hydraulic transmissivity to supply water to the pots 12.

The collapsible mat 16 is compressed under each pot, as shown in FIG. 2, and the locally compressed collapsible capillary mat under each pot 12 defines a localized capillary action conduit to conduct water between the rigid mat 17 and each pot 12 through the permeable top membrane 15.

With reference to FIG. 2, the cycle of water movement is illustrated. As indicated with arrows, the initial water is provided by the irrigation sprinkler 21 in the form of precipitation. Some of the sprinkled water will fall on the plants 14 and into the pot 12, however, a large portion will fall on the capillary carpet 10 between the pots 12. The sprinkled water will percolate under gravity through the micropores of the permeable top membrane 15 into the collapsible capillary mat 16 and further downward to be stored in the pores of the rigid capillary mat 17. The impermeable base membrane 18 prevents water from escaping the capillary carpet 10 into the underlying supporting soil surface 19.

The rigid mat 17 is designed with a selected hydraulic transmissivity at saturation at least equal to the evapotranspirative demand of the plants 14. With reference to FIG. 2, the hydraulic connection between the rigid capillary mat 17 and the permeable pot base 20 enables water to pass under capillary action as indicated by arrows into the pot 12. A relatively small amount of evaporated water will pass through the compressible capillary mat 16 and through the pores of the permeable top membrane 15 as indicated by arrows. The bulk of the water, however, will be conducted into the soil substrate 13 within the pot 12. A portion of the water will escape in the form of evaporation from the soil substrate 13 as indicated by an arrow. A substantial amount of the water will be absorbed by the roots of the plant 14, utilized in photosynthesis by the plant and exhausted to the ambient air through evapotranspiration of the plant as indicated by an arrow.

Both the rigid capillary mat 17 and the compressible capillary mat 16 are porous synthetic geotextiles with high porosity and each one generally with an uncompressed thickness of about 5 millimeters.

The rigid capillary mat 17 has a fine pore structure whereas the compressible capillary mat 16 has a coarse pore structure in the embodiment illustrated. This choice of pore sizes in general provides a rigid mat 17 and a compressible mat 16 where both mats are made of the same synthetic material. If different materials with different elasticity were used however, it may be possible to have pore sizes that are of relatively the same size.

The capillary carpet 10 therefore, provides a superior control of surface water evaporation over conventional carpets. The fine pores of the lower rigid mat 17 provide a water reservoir. The relatively large or coarse pores of the compressible coarse mat 16 act as a mulch and inhibit the evaporation of water from the rigid mat 17.

As shown in FIG. 1, the capillary mat assembly 9 is cut into sections or individual sub-units 9a, 9b, 9c . . . each of which is received in a reservoir formed by the water impermeable base membrane 18. In this way, each capillary mat sub-unit is hydraulically isolated from its neighbors, thereby preventing water migration from one sub-unit to the next. This ensures that the water stocked in the capillary mat assembly 9 will not drain from the highest point in the field to the lowest point in the event that the carpet 10 is laid down on an uneven soil surface or a sloped soil surface. By so breaking the hydraulic conductivity of the capillary mat assembly 9 in the direction of the slope on which the carpet 10 is laid, the slope effect is limited to the sub-unit only, and the drainage effect that might have had the lowest point is stopped.

As shown in FIG. 1, the capillary mat assembly 9 is preferably cut into square sections of 1 to 5 meters depending of the slope of the surface on which the carpet 10 has to be installed. The reservoirs or impermeable basins separating the sections of capillary mat (sub-units 9a, 9b, 9c . . . ) are formed by creating a series of longitudinally spaced-apart transversal folds 23 in the water impermeable base membrane 18 and by folding the opposed longitudinal sides 25 as well as the opposed end edges 27 of the base membrane 18 upwardly around the mat assembly 9 in such a manner that the water impermeable base membrane 18 surrounds the mat assembly 9 on all sides thereof from bottom to top, therefore forming a plurality of reservoirs hydraulically disconnected from one another. The water impermeable base membrane 18 is preferably heat wire sealed to maintain the longitudinal side edges 25 and the end edges 27 of the water impermeable membrane 18 folded upwardly and to ensure the permanent nature of the longitudinally transversal folds 23. The folds act as water barriers to oppose to the flow of water from one sub-unit to the other. This allows the whole system to operate on sloppy land and to more efficiently operate with coarse growing media. Indeed, the present design is also important to induce the capillary contact with very coarse growing media 13 as it allows raising the level of water up to the slick. This rising of the level of water allows the water to pass into any void that might be formed at the bottom of the pots 12 by the coarse growing media 13 and, thus ensure capillary contact between the mat assembly 9 and the growing media 13 in the pots 12. After a while, the void will be filled by migration of fine growing particles media, thereby rendering flood condition of the mat less and less necessary. As shown in FIG. 2, small drain holes 29 can be defined at selected locations in the raised peripheral edges 25 and 27 of the water impermeable membrane 18 and/or in the bottom surface thereof so as to solely temporarily rise the level of water of each sub-unit and, thus, permit excess water to flow out of at least some of the formed reservoirs while still inhibiting water flow from one sub-unit to the next.

For sanitary reason, this mode of installation, wherein the capillary mat is divided into a plurality of hydraulically disconnected mat sections, also minimize the risk of root disease spreading through the mat, as the sub-units 9a, 9b, 9c . . . are independent of one another and, thus, water carrying diseases cannot move between those units.

The capillary carpet 10 is preferably manufactured from three separate rolls of material, namely a roll of water impermeable membrane, a roll of water permeable membrane and a roll of capillary mat. A length of water impermeable membrane is first unrolled. Then a coextensive length of capillary mat is conjointly unrolled on a top surface of the water impermeable membrane. On each side of the capillary mat, the longitudinal side edges and the end edges of the water impermeable membrane are folded upwardly on a distance of about 2–3 centimeters against the mat to form a water impermeable basin thereabout. The formed fold is then heat sealed or otherwise secured in position. Thereafter, the web of mat is cut transversally at spaced-apart locations along the length thereof to form a row of capillary mat sub-units. At the same time, longitudinally transversal folds are formed and heat sealed in the water impermeable base membrane between the capillary mat sub-units. Finally, the water permeable top membrane is unrolled onto the capillary mat sub-units and the finished product is rolled onto a pick-up spool provided at the end of the production line. In summary, the finished product is formed by a series of capillary mat sub-units hydraulically separated from one another by a continuous water impermeable web and covered by a protective layer.

As shown in FIG. 1, a plurality of carpet 10 can be laid side-by-side on a soil surface to cover a desired surface area, thereby providing a checkered pattern of hydraulically isolated capillary mat sub-units.

According to a second embodiment of the present invention, a series of transversal tubes inflated by air or water could be provided on the base membrane between the mat units 9a, 9b and 9c to act as the water barriers to prevent water contained in the mat to flow from one section thereof to another. Alternatively, the soil surface itself could be modulated to form a series of crests and troughs in a direction perpendicular to the slope of the surface. In this case, the capillary mat could be provided in the form of a continuous web of material with no discontinuity. The flow of water towards the bottom of the slopes would be limited by the so formed crests (water barriers) on which the carpet is laid down.

It is pointed out that the carpet could also be sold in the form of individual sub-units adapted to be placed side-by-side in a checkerboard configuration on the supporting surface. Each sub-unit would include a water permeable top membrane covering a capillary mat unit secured in a water impermeable barrier formed by the water impermeable base membrane. The base membrane would be folded upwardly at its periphery to cover the sides of the capillary mat.

The invention claimed is:

1. In a capillary carpet irrigation system including a water bearing capillary carpet disposed on a supporting surface and a plurality of water permeable pots resting upon and in hydraulic connection with the carpet, the pots adapted for containing roots of plants disposed therein, and irrigation means for supplying water to the carpet, the improvement comprising:
   a capillary carpet comprising:
      a water impermeable base membrane;
      a water permeable top membrane; and
      a layer of spaced-apart capillary mat units disposed between the base membrane and the top membrane, each capillary mat unit being capable of receiving water from the irrigation means and defining a plurality of capillary action conduits between the base membrane and each water permeable pot through the permeable top membrane, wherein said capillary mat units are hydraulically isolated from one another to resist water to flow from one unit to another.

2. A capillary carpet as defined in claim 1, wherein water barriers extend upwardly from said water impermeable base membrane between said capillary mat units.

3. A capillary, carpet as defined in claim 2, wherein said water bafflers are integral to said water impermeable base membrane.

4. A capillary carpet as defined in claim 3, wherein at least some of said water barriers are provided in the form of transversal folds in said water impermeable base membrane.

5. A capillary carpet as defined in claim 1, wherein said carpet is provided with opposed raised edges to prevent water stocked in the capillary mat units to seep from the sides of the carpet.

6. A capillary carpet as defined in claim 5, wherein said water impermeable base membrane has opposed longitudinal side edges and opposed end edges, said opposed longitudinal side edges and said end edges being folded upwardly to form said raised edges.

7. A capillary carpet as defined in claim 1, wherein said capillary mat units are arranged in rows between said top and base membranes.

8. A capillary carpet as defined in claim 7, wherein said capillary mat units are placed in a checkerboard pattern on said water impermeable base membrane.

9. A capillary carpet as defined in claim 1, wherein said spaced-apart capillary mat units are hydraulically separated from one another by said impermeable base membrane.

10. A capillary carpet as defined in claim 9, wherein said water impermeable base membrane is provided in the form of a continuous web of material having transversal folds formed at longitudinally spaced-apart locations along the length thereof to provide a series of water barriers between adjacent capillary carpet units.

11. A capillary carpet as defined in claim 10, wherein said continuous web of material has opposed longitudinal side edges, said longitudinal side edges being folded upwardly to cooperate with said transversal folds to form a series of individual reservoirs in which said capillary mat units are placed.

12. A method of manufacturing a capillary carpet comprising the steps of: providing a web of water impermeable material, providing a web of capillary mat material on said web of water impermeable material, cutting said web of capillary mat material at longitudinally spaced-apart locations to form a series of capillary mat units, hydraulically isolating said capillary mat units from one another by forming a series of folds in said web of water impermeable material between adjacent capillary mat units, and covering a top surface of said web of capillary mat material with a water permeable protective web.

13. A method as defined in claim 12, wherein said web of water impermeable material has opposed longitudinal side edges and opposed end edges, and wherein the method further comprises the step of folding said opposed longitudinal side edges and said opposed end edges upwardly to form a water impermeable basin about said capillary mat units.

14. A method of installing a capillary carpet on a supporting surface, comprising the steps of: providing a length of capillary carpet, the carpet including a water impermeable base layer, a water permeable top layer and a capillary mat between said top and base layers, and providing a series of spaced-apart water barriers along said length of capillary carpet to limit travel of water through said mat.

* * * * *